(12) United States Patent
Ben Naim et al.

(10) Patent No.: US 10,607,027 B1
(45) Date of Patent: Mar. 31, 2020

(54) SECRETLESS SECURE DATA DISTRIBUTION AND RECOVERY PROCESS

(71) Applicant: CyberArk Software Ltd., Petach-Tikva (IL)

(72) Inventors: Kobi Ben Naim, Petach-Tikva (IL); Gil Makmel, Petach-Tikva (IL); Ariel Beck, Petach-Tikva (IL); Or Gamliel, Petach-Tikva (IL); Amir Levy, Petach-Tikva (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 16/210,354

(22) Filed: Dec. 5, 2018

(51) Int. Cl.
| | |
|---|---|
| *H04L 29/06* | (2006.01) |
| *G06F 21/62* | (2013.01) |
| *H04L 9/08* | (2006.01) |
| *H04L 9/14* | (2006.01) |
| *G06F 21/60* | (2013.01) |

(52) U.S. Cl.
CPC ........ *G06F 21/6245* (2013.01); *G06F 21/602* (2013.01); *G06F 21/604* (2013.01); *H04L 9/0861* (2013.01); *H04L 9/0894* (2013.01); *H04L 9/14* (2013.01); *H04L 63/0414* (2013.01); *H04L 63/0428* (2013.01); *H04L 63/0876* (2013.01); *H04L 63/102* (2013.01); *G06F 2221/2141* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,178,021 | B1* | 2/2007 | Hanna ................. | G06F 21/6209 713/150 |
| 8,984,611 | B2* | 3/2015 | Jeannot .................. | H04L 63/08 726/9 |
| 2005/0005135 | A1* | 1/2005 | Chen ..................... | H04L 9/0866 713/185 |
| 2010/0098253 | A1* | 4/2010 | Delerablee ............ | H04L 9/3073 380/259 |

(Continued)

OTHER PUBLICATIONS

Wikipedia, Secret sharing, accessed Dec. 5, 2018 at https://en.wikipedia.org/wiki/Secret_sharing (7 pages).

(Continued)

*Primary Examiner* — Malcolm Cribbs
(74) *Attorney, Agent, or Firm* — Finnegan, Henderson, Farabow, Garrett & Dunner LLP

(57) ABSTRACT

Disclosed embodiments relate to decentralized and scalable trust among a plurality of decentralized applications. Techniques include receiving, at a first decentralized application, a signature associated with a first public key, receiving data representing one or more permissions specified by a trusted root application and signed by the trusted root application, signing a second public key associated with a second decentralized application, signing data representing one or more permissions specified by the first decentralized application, and providing the signature associated with the second public key and the signed data representing one or more permissions specified by the first decentralized application, in order to thereby provide trust between the first decentralized application and the second decentralized application.

20 Claims, 12 Drawing Sheets

(56) References Cited

U.S. PATENT DOCUMENTS

2013/0013931 A1\* 1/2013 O'Hare ................ H04L 9/0822
713/189

OTHER PUBLICATIONS

Wikipedia, Shamir's Secret Sharing, accessed Dec. 5, 2018 at https://en.wikipedia.org/wiki/Shamir%27s_Secret_Sharing (8 pages).
Wikipedia, Secret sharing using the Chinese remainder theorem, accessed Dec. 5, 2018 at https://en.wikipedia.org/wiki/Secret_sharing_using_the_Chinese_remainder_theorem (4 pages).
Wikipedia, Proactive secret sharing, accessed Dec. 5, 2018 at https://en.wikipedia.org/wiki/Proactive_secret_sharing (3 pages).
Wikipedia, Verifiable secret sharing, accessed Dec. 5, 2018 at https://en.wikipedia.org/wiki/Verifiable_secret_sharing (4 pages).

\* cited by examiner

SECRETLESS SECURE DATA DISTRIBUTION AND RECOVERY PROCESS

BACKGROUND

Data privacy is of critical concern to individuals, companies, and government agencies. Individuals are generating and sharing various types of sensitive data, including personal data (e.g., social, financial, behavioral, etc.) and data they have received from others. Companies are receiving and storing such data from users (e.g., through social media applications, business applications, home automation products, etc.), as well as their own sensitive data (e.g., corporate planning, finances, human resources, competitive intelligence, etc.). Governments agencies are collecting data from citizens and non-citizens, collecting environmental and intelligence data, sharing data among agencies, and exchanging data with private enterprises. These various types of data are continuously expanding in variety and volume, and are being stored in numerous different storage platforms (e.g., personal computers, mobile devices, corporate servers and databases, private and public cloud storage, etc.). In many cases, the data is further replicated or mirrored for storage on backup equipment.

Unfortunately, data in such environments is often stored in an unsecure manner. In some circumstances, data is stored in an unencrypted manner on hard drives or in databases. Even in situations where attempts are made at data security, such as data encryption, data is often stored on a single server (or limited group of servers) and encrypted by a single master key, and consequently the data, and access to it, may be vulnerable to various attack techniques. For example, if an attacker performs a denial-of-service attack on a storage server, or a credentials server controlling access to the data, the data will not be accessible. The attacker can also steal the master key (e.g., through a privilege-escalation attack, phishing, malicious insider, etc.) and decrypt the stored data. In addition, the server is vulnerable to a physical attack, or accidental damage, such as when the hard drive gets stolen, broken, or damaged.

Users, generators, and hosts of sensitive data are concerned about the security of their data. High-profile data losses, attacks, and ransom attempts heighten these concerns. Even large, well-known enterprises (e.g., leading social network providers, software companies, gaming companies, e-commerce sites, etc.) cannot guarantee the safe storage and handling of users' data. Moreover, even if such enterprises could ensure the safe storage of users' data, users still maintain concerns that the enterprises will use the data in ways that the users to not authorize. For example, users have concerns that companies may use their data for creating unauthorized behavioral profiles, and may even share the data with other companies or government agencies. Given the inherent ease of copying data and sharing it, and the inherent difficulty in users controlling their data once it has been disseminated, the need for secure handling and storage of data is fundamental in nature and complex to achieve.

Accordingly, in view of these and other deficiencies in existing techniques, technological solutions are needed for securely generating, storing, and sharing sensitive data. Solutions should advantageously allow users to uniquely control who else can access their data, while preventing access by others. Indeed, even if user data is replicated or shared without the user's knowledge, or stored in an insecure manner, the security of the data should still be maintained. Further, users should be able to access their own data, and other data shared with them, in an authorized manner upon demand and without undue complications or difficulties. Further, solutions should be highly scalable, such that there are no significant increases in computational power, bandwidth, or storage space required to implement them.

In addition, such technological solutions should be credential-less and secret-less in their implementation. Secrets (e.g., tokens, passwords, keys, etc.) should not be stored and made vulnerable anywhere in a system. Users should not be required to present such secrets in order to obtain access to their data. At the same time, only the user who owns certain data should be able to access it. For example, a unique biometric trait or other unique information type accessible only to the actual physical user may be used to enable the user to access (e.g., decrypt) their data. Through such a technique, an enterprise storing the data would not be able to access (e.g., decrypt) the data. Nor would a malicious user who managed to steal the data be able to access (e.g., decrypt) the data.

SUMMARY

The disclosed embodiments describe non-transitory computer readable media, systems, and methods for secure distribution, storage, sharing, and use of client identity data. For example, in an exemplary embodiment, there may be a non-transitory computer readable medium including instructions that, when executed by at least one processor, cause the at least one processor to perform operations for secure distribution and use of client identity data. The operations may comprise identifying data associated with a client identity to be transmitted over a network to a data hosting resource; accessing a first cryptographic key; encrypting the data using the first cryptographic key; encrypting the first cryptographic key using a second cryptographic key, such that the encrypted first cryptographic key can be decrypted based on a person having rights to the data providing a unique physical attribute; and sending the encrypted first cryptographic key and the encrypted data to the data hosting resource over the network, wherein the data hosting resource cannot decrypt the encrypted first cryptographic key or the encrypted data; wherein the data hosting resource is configured to store the encrypted first cryptographic key and the encrypted data in one or more data storage locations.

According to a disclosed embodiment, the person is associated with the client identity.

According to a disclosed embodiment, the non-transitory computer readable medium is part of a device on which the client identity operates.

According to a disclosed embodiment, the non-transitory computer readable medium is part of a proxy agent in communication with the client identity.

According to a disclosed embodiment, the first cryptographic key is a symmetric key.

According to a disclosed embodiment, the second cryptographic key is a public key.

According to a disclosed embodiment, the operations further comprise separating the encrypted data into a plurality of data portions and sending the plurality of data portions to the data hosting resource.

According to a disclosed embodiment, the data hosting resource is configured to separate the encrypted data into a plurality of data portions and store the plurality of data portions in separate data storage locations.

According to a disclosed embodiment, the data hosting resource is configured to reconstruct the encrypted data from at least a subset of the plurality of data portions in the separate data storage locations.

According to a disclosed embodiment, the data hosting resource is configured to compute a number of the separate data storage locations in which to store the plurality of data portions.

According to a disclosed embodiment, the operations further comprise receiving the encrypted data from the data hosting resource; receiving the encrypted first cryptographic key from the data hosting resource; and decrypting the encrypted first cryptographic key using the unique physical attribute.

According to another disclosed embodiment, a method may be implemented for secure distribution and use of client identity data. The method may comprise identifying data associated with a client identity to be transmitted over a network to a data hosting resource; accessing a first cryptographic key; encrypting the data using the first cryptographic key; encrypting the first cryptographic key using a second cryptographic key, such that the encrypted first cryptographic key can be decrypted based on a person having rights to the data providing a unique physical attribute; and sending the encrypted first cryptographic key and the encrypted data to the data hosting resource over the network, wherein the data hosting resource cannot decrypt the encrypted first cryptographic key or the encrypted data; wherein the data hosting resource is configured to store the encrypted first cryptographic key and the encrypted data in one or more data storage locations.

According to another disclosed embodiment, accessing the first cryptographic key includes generating the first cryptographic key.

According to another disclosed embodiment, the method further comprises identifying a separate identity with which the data associated with the client identity should be shared; and encrypting the first cryptographic key using a key from a keychain including one or more keys associated with the encryption of the first cryptographic key, wherein the keychain includes a key associated with the separate identity.

According to another disclosed embodiment, the method further comprises storing the encrypted first cryptographic key in association with the encrypted data.

According to another disclosed embodiment, the method further comprises storing the encrypted first cryptographic key in metadata of the encrypted data.

According to another disclosed embodiment, the data hosting resource is configured to separate the encrypted data into a plurality of data portions and store the plurality of data portions in separate data storage locations.

In another exemplary embodiment, there may be a non-transitory computer readable medium including instructions that, when executed by at least one processor, cause the at least one processor to perform operations for secure distribution and use of client identity data. The operations may comprise receiving, at a data hosting resource, an encrypted first cryptographic key and encrypted data; wherein the received encrypted data has been encrypted using the first cryptographic key; wherein the received encrypted first cryptographic key has been encrypted using a second cryptographic key; wherein the encrypted first cryptographic key can be decrypted based on a person having rights to the dataproviding a unique physical attribute; and storing the encrypted first cryptographic key and the encrypted data in one or more data storage locations associated with the data hosting resource, wherein the data hosting resource cannot decrypt the encrypted first cryptographic key or the encrypted data.

According to another disclosed embodiment, the operations further comprise separating the encrypted data into a plurality of data portions and storing the plurality of data portions in separate data storage locations associated with the data hosting resource.

According to another disclosed embodiment, the operations further comprise reconstructing the encrypted data from at least a subset of the plurality of data portions in the separate data storage locations associated with the data hosting resource.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques of secretless sharing of sensitive data described herein overcome several technological problems. As discussed below, the owner of particular data (e.g., its creator, or an authorized recipient) may uniquely be able to decrypt the data. In some embodiments, the decryption is based on a unique physical (e.g., biometric) trait of the owner. For example, each piece of data (e.g., file, group of files, portion of a single file, etc.) may be signed by the owner's private key, which may be based on their unique physical trait. Accordingly, even if the user's data is misappropriated while being stored at a remote storage system, the content of the data will remain protected and accessible only to the user using their unique physical trait. Further, for added security and flexibility, the data may be separated into multiple portions (e.g., by the user or by the storage system) and stored as separate portions that are combinable to reconstitute the data. Additionally, predictive controls may be utilized for encrypting and decrypting the data, as well as for generating security alerts.

Reference will now be made in detail to the disclosed embodiments, examples of which are illustrated in the accompanying drawings.

Figure 1:
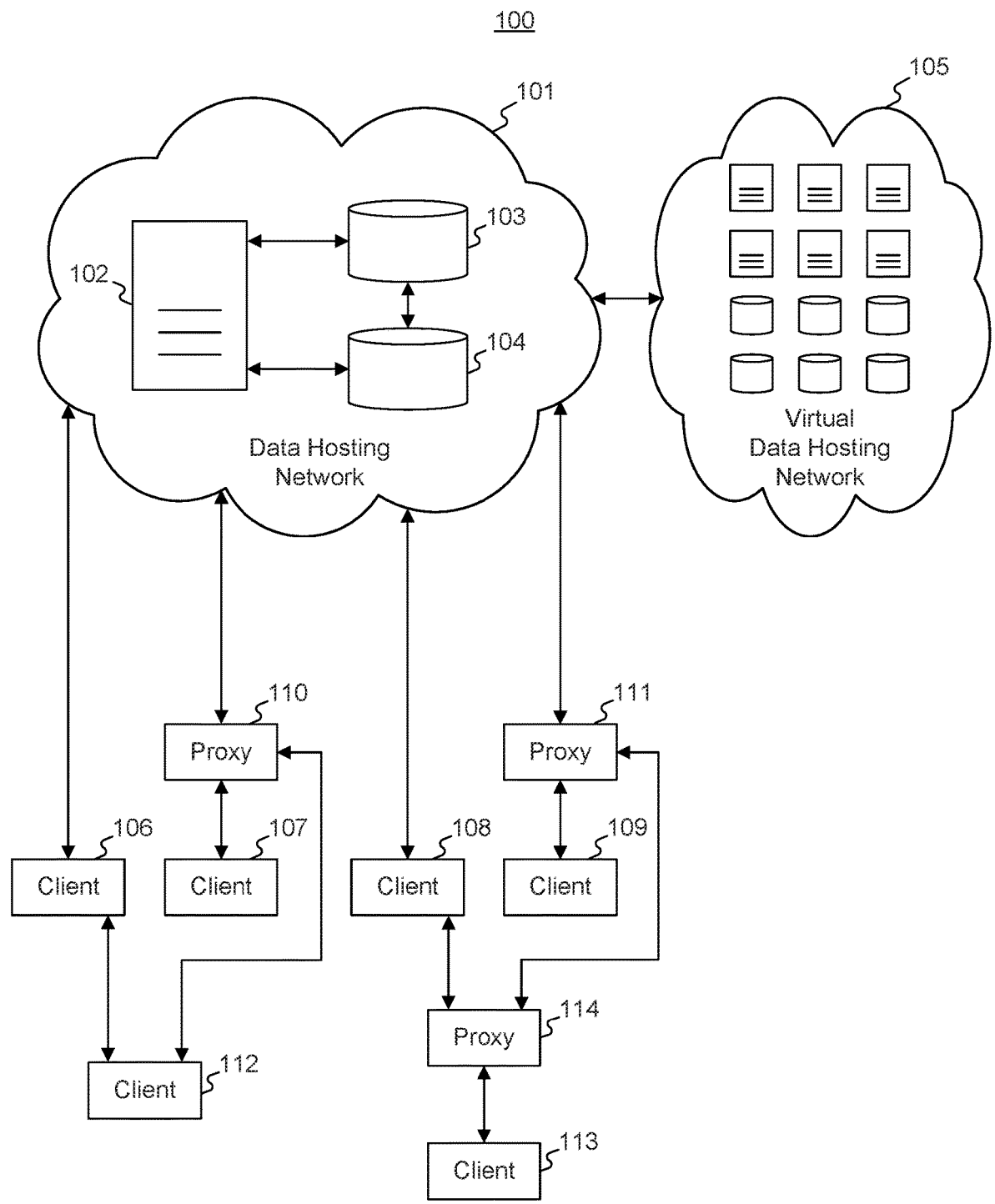
FIG. 1 is a block diagram of an example system for secure distribution and use of client data in accordance with disclosed embodiments.

FIG. 1 is a block diagram of an example system 100 for secure distribution and use of client data consistent with disclosed embodiments. As shown, system 100 includes a plurality of clients 106, 107, 108, 109, 112, and 113, some of which have associated proxy services 110, 111, and 114 (e.g., integrated proxy agents or external proxy servers). Clients 106, 107, 108, 109, 112, and 113, and proxy services 110, 111, and 114, may be configured to communicate with each other and/or data hosting network 101 to exchange client data, as well as potentially other types of data. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, a private data network, a virtual private network using a public network, a nearfield communications technique (e.g., Bluetooth, infrared, etc.), or various other types of network communications. In some embodiments, the communications may take place across two or more of these forms of networks and protocols. As shown in FIG. 1, client 106, for example, may communicate directly with data hosting network 101 while client 107 communicates with data hosting network 101 via proxy 110. Similarly, client 112 directly communicates with client 106, while client 113 communicates via proxy 114 with client 108.

In general, clients 106, 107, 108, 109, 112, and 113 may be configured to generate or capture different types of data, which they may share with each other, store locally, and/or upload to data hosting network 101. For example, clients 106, 107, 108, 109, 112, and 113 may be social media applications (e.g., Facebook™, Twitter™, Instagram™, etc.), where associated users capture or create images, video content, textual content, animations, applications, and more. Further, clients 106, 107, 108, 109, 112, and 113 may be web browsers that are used to access and share data with remote sites (e.g., e-commerce sites, file sharing sites, document management or archiving sites, utility provider sites, banking sites, online newspapers, etc.). As another example, clients 106, 107, 108, 109, 112, and 113 may be IoT applications (e.g., configured for home automation, surveillance, autonomous driving, etc.) that capture or generate data and share it with data hosting network 101 or each other. As discussed further below in connection with FIG. 3, clients 106, 107, 108, 109, 112, and 113, and proxies 110, 111, and 114, may have the hardware and/or software needed to participate in such content generation and sharing.

Data hosting network 101 may be one or more networks configured to interact with clients 106, 107, 108, 109, 112, and 113, and proxies 110, 111, and 114, and to store client data. For example, in a social media embodiment, data hosting network 101 may be a Facebook™, Twitter™, or Instagram™ platform, or other type of social media platform. Further, in a document sharing embodiment, data hosting network 101 may be a Box™, Dropbox™, Google Docs™, or iCloud™, network environment, configured to store, exchange, and archive documents. In other embodiments, data hosting network 101 may be a corporate network, an IoT hosting network, a web site (e.g., e-commerce site) network, or various other types of networks.

Data hosting network 101 may include one or more servers 102 configured to communicate with clients 106, 107, 108, 109, 112, and 113, and proxies 110, 111, and 114, and one or more databases 103 to store data provided by, or generated on behalf of, clients 106, 107, 108, 109, 112, and 113. Data in database 103 may be backed up or mirrored in secondary database 104. Further, in some embodiments, data collected by data hosting network 101 may be stored in a virtualized data hosting network 105, which may be based on a configuration of several virtual machines or container instances, or may utilize serverless code. Virtual data hosting network 105 may be, for example, a storage-as-a-service (SAAS) platform, such as one provided by IBM Cloud™, Amazon Web Services™, Microsoft Azure™, Carbonite™, or others. Of course, while clients 106, 107, 108, 109, 112, and 113, and proxies 110, 111, and 114, may be configured to directly communicate with server 102 in order to upload or download data, they may also interact directly with virtual data hosting network 105. For example, following an optional log-in procedure with server 102, clients 106, 107, 108, 109, 112, and 113, and proxies 110, 111, and 114, may be redirected to upload data directly to, or download data directly from, virtual data hosting network 105.

Figure 2:
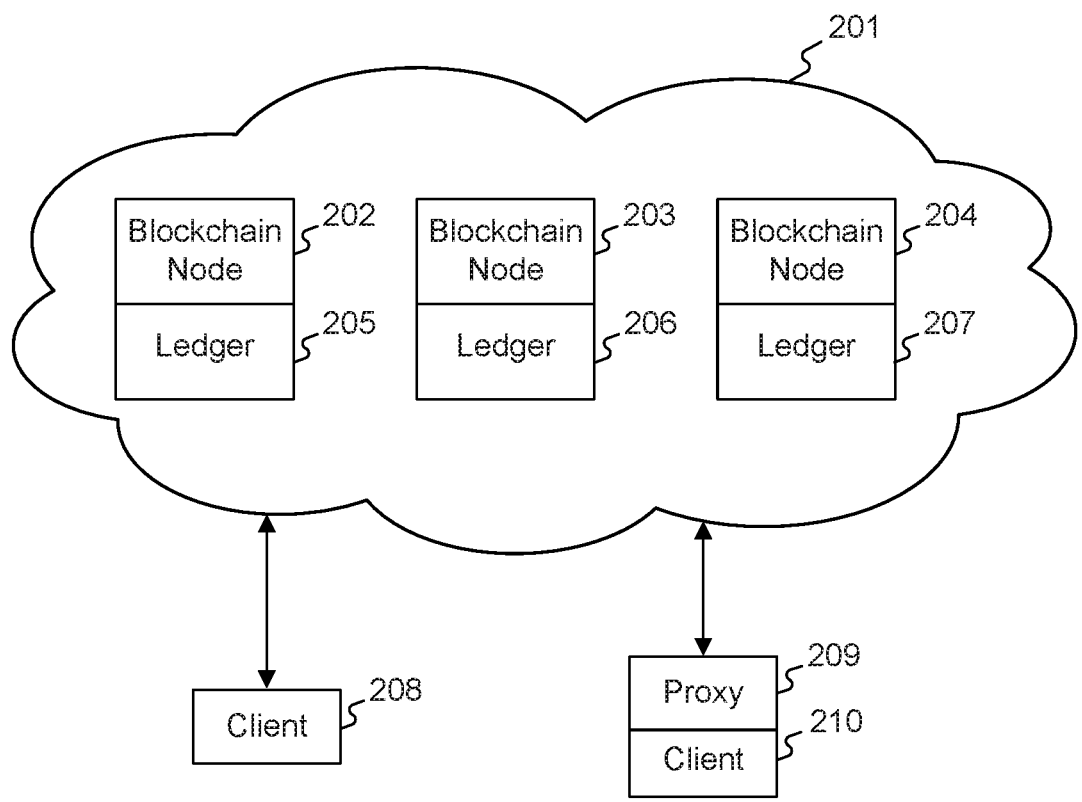
FIG. 2 is a block diagram of an example system where client data is securely shared over a blockchain network in accordance with disclosed embodiments.

FIG. 2 is a block diagram of an example system 200 where client data is securely shared over a blockchain network 201. Client 208 may be similar to clients 106 and 108 of FIG. 1, in that it communicates directly with blockchain network 201. Client 210 may be similar to clients 107 and 109, in that it communicates indirectly with blockchain network 201 through proxy 209. As shown in FIG. 2, blockchain network 201 includes several blockchain nodes 202, 203, and 204, each having a corresponding shared ledger 205, 206, and 207. For example, in some embodiments, clients 208 and 210 may engage in financial transactions (e.g., banking, securities trading, purchases, etc.) with other network resources participating in blockchain network 201. In other embodiments, clients 208 and 210 may engage with blockchain network 201 for purposes of authenticating themselves in a password-less and secret-less manner based on their behavior, as opposed to requiring such credentials. Of course, numerous other blockchain functions and applications are possible as ell. Shared ledgers 205, 206, and 207 may maintain common archives of transaction details, such that each may be able to validate a transaction based on the archived transaction information.

In embodiments where clients 208 and 210 communicate with blockchain network 201, blockchain nodes 202, 203, and 204 may each be a client application, similar to clients 208 and 210, or may be separate applications. In such embodiments, clients 208 and 210 may each have their own shared ledger (not shown). Shared ledgers 205, 206, and 207 may maintain records of transactions involving clients 208 and 210, as well as blockchain nodes 202, 203, and 204. For example, in a financial application, transactions may confirm pertinent data regarding purchases or sales of assets (e.g., identities of the participants, time information, quantities of assets being sold or bought, cryptographic keys, hash information, and various other related information). Blockchain network 201 may enforce a consensus algorithm for individual transactions, where ledgers 205, 206, and 207 are queried to validate the transaction in accordance with a minimum threshold level of consensus or confidence (e.g., 95%, 99%, or 100% consensus).

In embodiments involving blockchain network 201, clients 208 and 210 may want to share certain data with blockchain network 201 necessary for the consensus algorithm to be enforced, but not other data (e.g., sensitive personal data). Accordingly, when clients 208 and 210 engage in transactions with blockchain network 201, they may share certain data with other nodes (e.g., one or more of nodes 202, 203, 204) but encrypt sensitive personal information according to the techniques discussed further below.

As an example, in a financial transaction, client 208 may determine to share certain data with blockchain network 201 but encrypt, based on the techniques discussed below, other data, as follows:

| Data to Share | Data to Encrypt |
|---|---|
| Identity name/identifier | Account number |
| Counterparty identity name/identifier | Social security number |
| Time | |
| Transaction amount | |
| IP address of client/proxy | |
| IP address of counterparty | |

In another example, in a secretless authentication implementation (e.g., where a user is authenticated before they are permitted to open a locked door to a secure room, or to purchase an item from a vending machine), client 210 (via proxy 209) may determine to share certain data with blockchain network 201 but encrypt other data as follows:

| Data to Share | Data to Encrypt |
|---|---|
| Employee identity | Employee PIN number |
| Time | |
| Location | |
| Door identifier | |
| Geographical location | |

Of course, other forms of blockchain networks 201 are possible as well. As long as clients 208 or 210 wish to exchange certain data with blockchain network 201 and maintain the privacy and security of that data, the cryptographic techniques discussed further below may be advantageous to implement.

Figure 3:
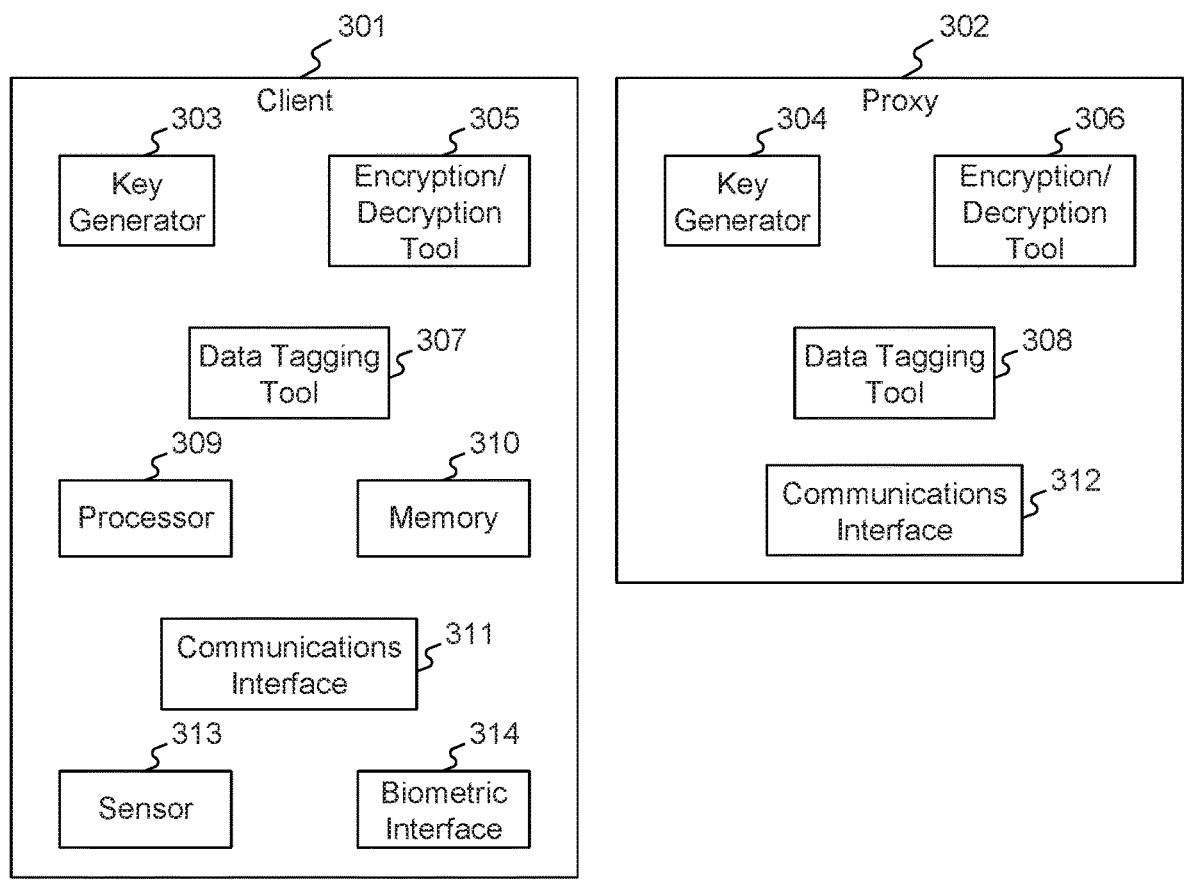
FIG. 3 is an exemplary illustration of a client and a proxy, as well as their components, in accordance with disclosed embodiments.

FIG. 3 is an exemplary illustration 300 of a client 301 and a proxy 302, as well as their respective components. Consistent with the discussion regarding FIG. 1, above, client 301 and proxy 302 may each be a hardware-based computing device (e.g., personal computer, laptop, tablet, smartphone, IoT device, computer-embedded clothing, computer-embedded jewelry, sensor, vehicle electronic control unit, etc.), a software application running on a hardware-based computing device, or each may take a different form. For example, client 301 may be hardware-based (e.g., mobile device) while proxy 302 may be an application (e.g., mobile app) running on client 301. As another example, client 301 may be a personal computer, while proxy 302 may be software running on a network gateway that controlsaccess to or from client 301 with respect to an outside network, or running on an intermediary server configured to filter and reroute communications between client 301 and an outside network. Of course, in other embodiments, client 301 operates without a proxy 302 at all. In such embodiments, client 301 is configured to carry out the cryptographic techniques described below.

As an illustration, proxy 302 may be configured to determine when client 301 is attempting to upload content (e.g., sensitive personal data, images, videos, etc.) to a remote network, such as data hosting network 101 of FIG. 1. In such event, proxy 302 may be configured to enable the techniques of encryption discussed further below. In some embodiments, proxy 302 may be configured to encrypt all data communicated from client 301 to a remote network by default (e.g., based on an IP address or domain name of the remote network, or based on a particular application that client 301 is using to send such data). Alternatively, proxy 302 may be configured to encrypt only certain types of data (e.g., only data specifically identified by a user of client 301 as sensitive, or only data communicated during a secure session between client 301 and the remote network).

In some embodiments, client 301 and/or proxy 302 may utilize predictive controls to determine when a user is seeking to upload or share sensitive date. For example, client 301 or proxy 302 may have predictive controls software that automatically generates a prompt (e.g., GUI prompt) to the user, asking whether the user wants to treat certain data as sensitive, and thus subject to the encryption techniques discussed below. Alternatively, the predictive controls software may be configured to generate a prompt, recommending that certain data be classified as sensitive. The recommendations may be based on the type of data (e.g., user-captured image file, as opposed to publicly downloaded image file). As an example, the predictive controls software may detect that client 301 is utilizing a camera utility application configured to capture images (e.g., where client 301 is a smartphone). In that case, the predictive controls software may determine that any images captured during the running of the camera utility application should be treated as sensitive, and subject to the encryption techniques discussed below. In further embodiments, the predictive controls software may detect attributes of a session between the client 301 or proxy 302 (e.g., whether an HTTPS session is active, whether a log-in procedure has begun, whether a secure tunnel with the client 301 or proxy 302 has been established, etc.), If the attributes of the session are secure in nature, such as in those examples, any data uploaded by the client 301 or proxy 302 during such as session may be treated as sensitive and subject to the encryption techniques discussed below.

Various other types of predictive controls may be implemented as well. For example, the client 301 or proxy 302 may have predictive control software that detects keyboard strokes, touchscreen input, or other user interface input. These forms of detected input may represent a live stream of data being input by the user into the client 301 or proxy 302. Such detected input may be analyzed by an agent installed on the client 301 or proxy 302, and/or based on a software-based or operating system-based hook that intercepts or copies such input and sends it to the predictive control software. The predictive control software may then look for sensitive keywords or patterns in the detected input, and if sensitive content is detected, determine that the content should be automatically encrypted based on the techniques detailed below. Sensitive terms may be determined a several ways. For example, an AWS-based access key may start with "AKIA" or "ASIA" and therefore signal that the detected content is sensitive (e.g., the following content after such an identifier will be sensitive). Comparable starting identifiers for access keys for Azure™, IBM Cloud™, and other cloud platforms may be used as well. Similarly, a predefined vocabulary may be referenced to determine sensitive content (e.g., based on correlating detected input to terms like "credit card," "social security number," "SSN," "PIN," "code," "key," etc.).

Further, as a variation on the above techniques, the predictive control software may analyze cursor or touchscreen input to determine movement of a cursor.

For example, if the cursor is detected to be moving in the direction of an encrypted file on a screen (e.g., a file icon, a file directory, etc.), the client 301 or proxy 302 could automatically perform the types of encryption discussed below. Correspondingly, the cursor movement may be determined by the predictive control software to signal that the file should be decrypted based on the techniques discussed below. Such decryption may occur in advance of the user clicking on the file, so that the decryption is complete (or underway) by the time the user clicks on the file. If the user does not actually click on the file (e.g., after a threshold amount of seconds), the file may automatically be re-encrypted.

As another variation of such predictive controls, an agent in client 301 or proxy 302 may track different windows or tiles that the user opens, and predict sensitivity scores for such windows or tiles. As an example, if a user opens the folder of "Windows" it may be deemed more sensitive than the "Downloads" folder, since "Windows" may be known to contain files associated with the operating system of client 301 or proxy 302, whereas "Downloads" may be extraneous downloaded files. Similarly, window titles of "Setting" could be flagged as more sensitive than other tiles. Further, if a folder with an encrypted file is opened, the client 301 or proxy 302 may automatically begin to decrypt the file, even in advance of the user actually opening the file. If the user does not open the file (e.g., after a threshold of seconds), the file may automatically be re-encrypted.

Another example of predictive controls may involve tracking addresses (e.g., URLs or IP addresses) input by a user of client 301 or proxy 302 into a browser (e.g., Microsoft Internet Explorer™, Google Chrome™, Apple Safari™, etc.) or other application. If the user attempts to navigate to a sensitive address (e.g., a bank website, utility website, social media website, etc.), the predictive control software may determine that any content shared by the user with the website should be encrypted pursuant to the techniques discussed below. By contrast, if the user attempts to navigate to a neutral website (e.g., sports team site, news site, search engine, etc.), such encryption may not be automatically enabled. Also, if the user attempts to navigate to an unknown site, or a known questionable security site, the user's communications with the site may be automatically encrypted by default.

As shown in FIG. 3, client 301 and proxy 302 may each have key generation software 303/304, encryption and decryption software 305/306, metadata creation or tagging software 307/308, and a network communications interface 311/312. Each of these applications may be a component of a single software program, or each may be part of one or more dedicated, function-specific applications (e.g., applets, plugins, microservices, etc.). Additionally, client 301 may have a hardware-based sensor 313 and biometric interface 314, for use in obtaining personal, unique information (e.g., biometric information) regarding a user of client 301.

Key generator 303/304 may be configured to generate symmetric cryptographic keys and asymmetric cryptographic key pairs (e.g., public/private key pairs). In order to generate symmetric keys, for example, key generator 303/304 may store, or have access to, algorithms such as Data Encryption Standard (DES), Triple DES (TDES), Advanced Encryption Standard (AES), CAST-128, or various others. To generate asymmetric keys, key generator 303/304 may store, or have access to, algorithms such as Diffie-Hellman (DH), Digital Signature Standard (DSS), Rivest-Shamir-Adleman (RSA), or various others. In accordance with embodiments discussed below, key generator 303/304 may be configured to generate keys when needed. For example, if client 301 or proxy 302 determines that it needs to generate a symmetric or asymmetric key, it may do so on demand and as needed. Keys generated by key generator 303/304 may be stored in a memory unique to key generator 303/304, or in memory 310. As discussed further below, cryptographic keys generated by key generator 303/304 (e.g., a unique private key generated based on a biometric trait of a user) may be used to sign data created or to be shared by client 301.

Encryption and decryption tool 305/306 may be configured to encrypt and decrypt data, such as data created or to be shared by client 301. Further encryption and decryption tool 305/306 may be used to encrypt or decrypt cryptographic keys that are generated by key generator 303/304. As an example, and as further discussed below, a symmetric key generated by key generator 303/304 may be used to encrypt data created or to be shared by client 301. Such encryption may be performed by encryption and decryption tool 305/306. Further, encryption and decryption tool 305/306 may be used to encrypt the symmetric key itself using a public key from a public/private key pair. As discussed above, the private key in the pair may be based on a unique biometric or other physical trait of the user of client 301.

Data tagging tool 307/308 may be configured to insert information into metadata that accompanies data created by client 301. For example, if client 301 is exchanging an image file, the data tagging tool 307/308 may be configured to insert data into a header or trailer field of the image file. Similar data insertion may be performed for numerous other file types, such as word processing documents, video files, applications, etc. In additional embodiments, data tagging tool 307/308 may be configured to generate data that will accompany or be associated with data created by client 301 even though it is not inserted into a header or trailer field. For example, data tagging tool 307/308 may create a text file that is transmitted together with or nearly simultaneously with the file from client 301 to the remote network it is communicating with. As discussed further below, one type of data that data tagging tool 307/308 may store in metadata or a header/trailer field is a cryptographic key. For example, in below embodiments, an encrypted copy of the symmetric key generated by key generator 303/304 may be stored in metadata associated with data to be transmitted by client 301.

Client 301 and proxy 302 may also include one or more network communications interface 311/312 for engaging in communications with each other, with other clients or proxies, and with remote networks (e.g., data hosting network 101 or blockchain network 201, as discussed above). For example, network interface 311/312 may include physical communications interface components of client 301 or proxy 302 (e.g., Ethernet connection, WiFi transceiver, Bluetooth transceiver, RFID transceiver, infrared transceiver, cellular transceiver, mesh network transceiver, etc.). Further, network interface 311/312 may include software-based communications interfaces, such as software for application layer protocols (e.g., HTTP/S, RTP, SSH, etc.) or transport layer protocols (e.g., TCP/IP UDP, etc.).

In some embodiments, client 301 may further include a processor 309 and memory 310. According to embodiments where proxy 302 is a hardware-based device (e.g., a proxy server) rather than an application (e.g., software agent), proxy 302 may also include a processor 309 and memory 310. Processor 309 may be configured to execute program instructions associated with other components of client 301, such as instructions for implementing functions of key generator 303, encryption and decryption tool 305, and data tagging tool 307. Such instructions may be stored in memory 314, or in discrete memories associated with key generator 303, encryption and decryption tool 305, and data tagging tool 307. In addition, memory 310 may include program instructions for deploying an operating system (e.g., Microsoft Windows™, Apple iOS™, Unix/Linux, etc.) on client 301. Further, memory 310 may include program instructions for implementing the various techniques of encryption and decryption of client data discussed below, including those discussed in connection with FIGS. 4-12.

Client 301 may further include a sensor 313 and/or biometric interface 314. Consistent with embodiments below, sensor 313 and biometric interface 314 may be used to sense or detect various types of unique physical or other biometric traits of a user interfacing with client 301. Such unique physical or other biometric traits may be used by key generator 303/304 to generate a unique private key for the user of client 301, along with a corresponding public key. Examples of sensors 313 and biometric interface 314 include a fingerprint sensor, retinal scanner, microphone, camera, gyroscope, accelerometer, GPS, proximity sensor, magnetometer, luxmeter, loudspeaker, follicle analyzer, etc. As an illustration, sensor 313 or biometric interface 314 may be configured to detect a user's fingerprint or retina, and use that unique biometric trait to develop a corresponding private cryptographic key for the user having a corresponding public key. Such private/public key pairs are further discussed below.

Figure 4:
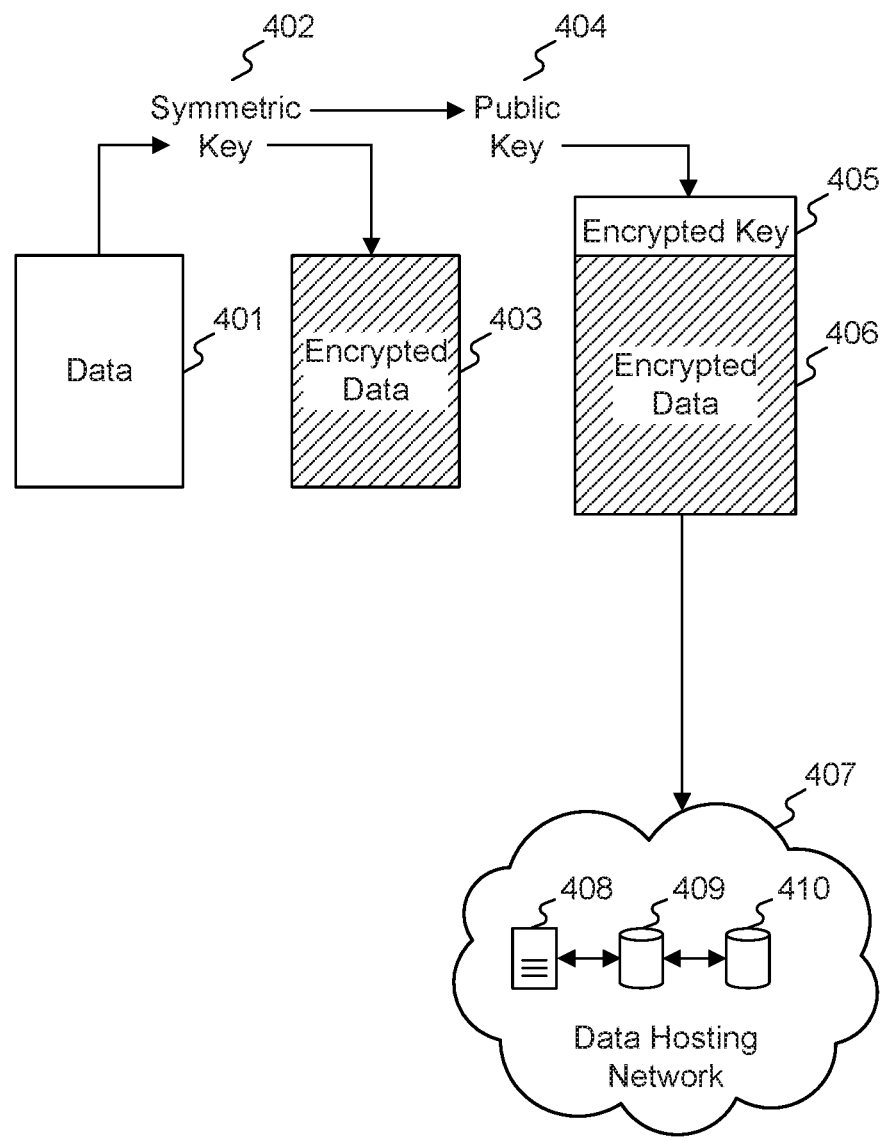
FIG. 4 is an exemplary illustration of a process of data encryption and hosting in accordance with disclosed embodiments.

FIG. 4 is an exemplary illustration of a process 400 of data encryption and hosting. Consistent with above embodiments, process 400 may be carried out in the environments of systems 100 or 200 discussed in connection with FIGS. 1 and 2, utilizing a client 301 and/or proxy 302 as discussed in connection with FIG. 3.

As part of process 400, a user of a client may choose to upload or share certain data 401 (e.g., an image, video, word processing document, etc.) with a remote network hosting system or with another client. For example, in a social media environment, the user may choose to upload an image or profile information to a server managed by Facebook™, Twitter™, Instagram™, etc. Alternatively, in a document hosting environment, a user may choose to upload a word processing document to server managed by Box™, Dropbox™, Google Docs™, or iCloud™, etc. As discussed above, in some embodiments the user may specifically identify (e.g., mark or classify) the data 401 as sensitive, whereas in other embodiments a proxy may be used to determine whether to treat the data 401 as sensitive. Alternatively, all data 401 uploaded or shared by the user may be deemed sensitive by default, and thus undergo the following steps of encryption in process 400.

In operation 402, the data 401 may be encrypted with a symmetric key. The symmetric key may be generated, or previously stored, by the client or proxy (e.g., by client 301's key generator 303, or by proxy 302's key generator 304, as discussed in connection with FIG. 3). The symmetric key may be generated according to various algorithms, such as DES, TDES, RES, CAST-128, or others. The encrypted version of the data 403 may be stored temporarily (e.g., in cache on the client or proxy) or on a long-term basis (e.g., in memory 310), and thus may be available from such storage for transmission to data hosting network 407. Of course, in other embodiments, data 401 may be encrypted with a non-symmetric key, such as a key from a private/public key pair. Data 401 may be encrypted in other techniques as well.

In operation 404, the client or proxy may encrypt the symmetric key using a public key. For example, consistent with the above discussion, the encryption and decryption tool 305/306 of the client 301 or proxy 302 may be used to encrypt the symmetric key using a public key generated by key generator 303/304 as part of a private/public key pair. The corresponding private key may be based on the user's physical or other biometric attributes, as discussed above. Once the symmetric key is encrypted in operation 404, it may be included in metadata 405 of the encrypted data 403, as shown in metadata 405 and encrypted data 406. As discussed above, the metadata 405 may be a header or trailer field of the encrypted data 406, or may be a separate file. The metadata 405 may be created by data tagging tool 307/308. Of course, in alternative embodiments, the symmetric key (or other key) included in metadata 405 may be encrypted through other techniques not involving the user's public key.

Once the encrypted data 406 and metadata 405 including the encrypted symmetric key have been prepared, they may be sent to data hosting network 407. Consistent with FIG. 1, data hosting network 407 may include a communications server 408 configured to handle requests from the client or proxy, as well as to serve content to the client or proxy. For example, as discussed above, the data hosting network 407 may be a social media site or document archiving site, where server 408 receives uploaded content from a client and stores it in database 409, with a replicated or backup copy in database 410. In other embodiments, as discussed above, the encrypted data 406 and metadata 405 may be transmitted through a blockchain network, such as blockchain network 201. In such an embodiment, while certain transaction data may be available to blockchain nodes 202, 203, and 204, and stored in shared ledgers 205, 206, and 207, the encrypted data 406 and metadata 405 may remain secure and protected, since they are only decryptable by the user based on the user's private key that can decrypt the encrypted symmetric key in metadata 405. Thus, even if the encrypted data 406 and metadata 405 are available to blockchain nodes 202, 203, and 204, and stored in shared ledgers 205, 206, and 207, the owners of the blockchain nodes 202, 203, and 204 will not be able to access (e.g., decrypt) the encrypted data 406 without the user's private key, which (as discussed above) may be based on their unique physical or other biometric traits). As discussed further below, encrypted data 406 and metadata 405 may be later retrieved or requested by the client or proxy from data hosting network 407. When they are received by the client or proxy, the encrypted symmetric key in metadata 405 may be decrypted (e.g., using the user's private key based on physical or biometric traits) to reveal the symmetric key, which may then be used to decrypt the encrypted data 406 itself.

Figure 5:
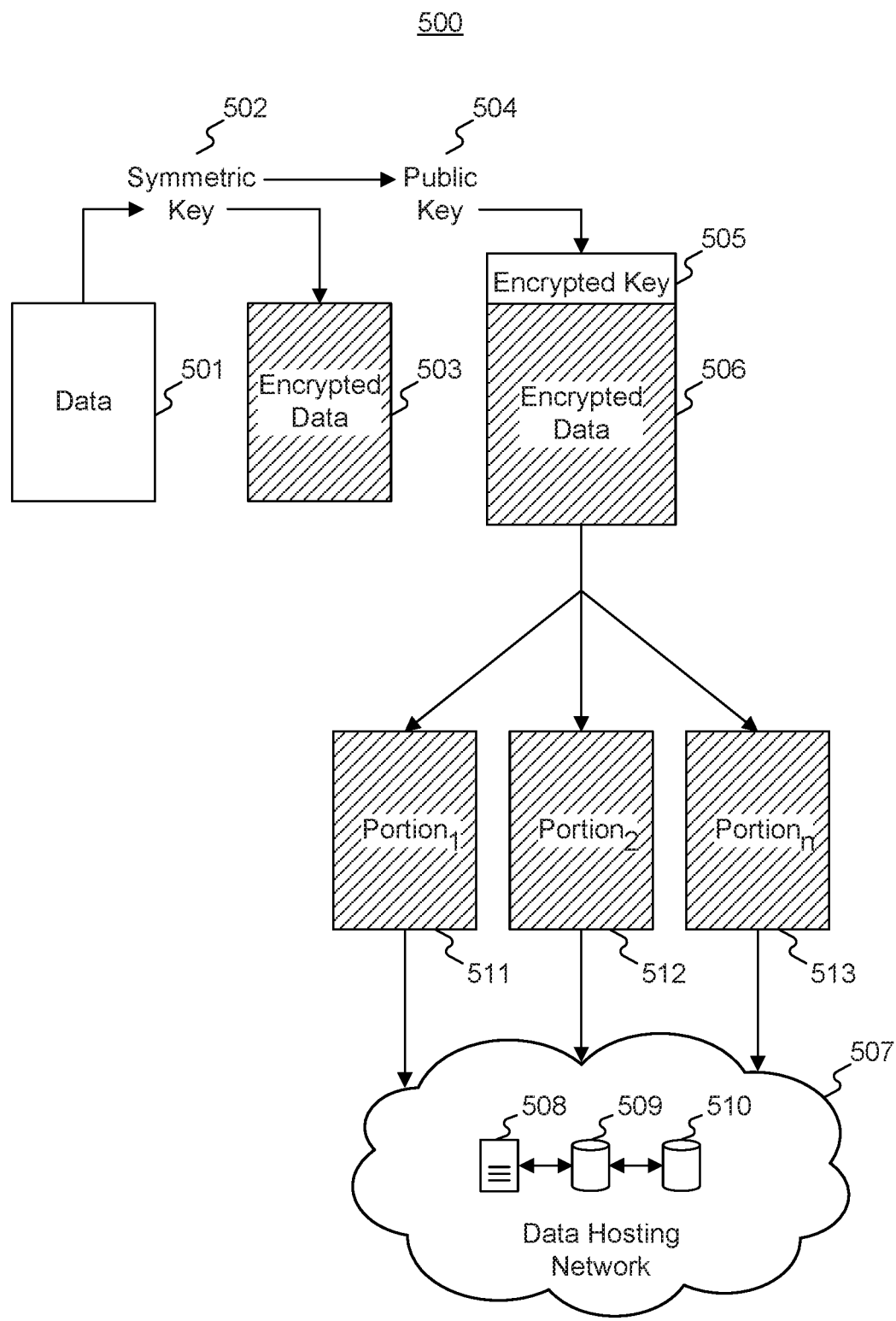
FIG. 5 is an exemplary illustration of a process of data encryption and hosting, where the client or proxy splits the data into portions, in accordance with disclosed embodiments.

FIG. 5 is an exemplary illustration of a process 500 of data encryption and hosting, where the client or proxy splits the data into portions before transmitting them to data hosting network 507. Like process 400, process 500 may be performed in the environments of systems 100 or 200 discussed in connection with FIGS. 1 and 2, utilizing a client 301 and/or proxy 302 as discussed in connection with FIG. 3.

The elements of FIG. 5 are generally similar to those of FIG. 4. For example, data 501 encrypted data 503, and encrypted data 506 plus metadata 505 may all be similar to their counterpart elements 401, 403 406, and 405 of FIG. 4. In addition, operation 502 of encrypting the data 501 may be similar to operation 402, and operation 504 of encrypting the symmetric key using a public key of the user may be similar to operation 404. Further, data hosting network 507, including server 508, database 509, and backup storage 510 may be similar to elements 407, 408, 409, and 410 of FIG. 4.

Unlike process 400, however, process 500 involves the client or proxy splitting the encrypted data 506 into three or more portions, shown in FIG. 5 as Portion$_1$511, Portion$_2$512, and Portion$_n$513. Of course, encrypted data 506 may be split into fewer (e.g., two) or greater portions. Notably, the splitting may also occur at different points. For example, the splitting may involve splitting data 501 into multiple portions before it is encrypted, and then encrypting the portions. Alternatively, the splitting may occur based on encrypted data 503 before metadata 505 is added, or based on encrypted data 506 after metadata 505 is added, In accordance with process 500, the client or proxy may be configured to perform a particular file splitting (e.g., sharding) technique. For example, the number of portions into which to split data may be based on an algorithm such as Shamir's secret-sharing scheme, Blakley's scheme, or various other types of schemes. According to such a scheme, the user may choose to upload a file via its client or proxy to data hosting network 507. The client or proxy may split the file into N shards and designate them for storage in X remote storage services (e.g., multiple database 509, or portions of a single database 509), Then, when the user requests the file via the client or proxy, the shards may be collected from any subportion X-Y storage locations, where X is greater than Y. Each storage location may get several encrypted pieces of the file, and the file can be reconstructed (e.g., at the client, proxy, or the storage location by any X-Y (X>Y) storage locations.

As an example, a user of a client may wish to securely send their social security number to a financial services site for purposes of a financial transaction. Of course, in other embodiments, the user may be sharing other data (e.g., an image, video file, executable file, etc.). In this example, for simplicity, the user's social security number may be 1234. The client or proxy may determine that it wants any 3 servers or databases out of 6 to be able to reconstruct the social security number. Accordingly:

S—Secret (e.g., social security number)=1234
N—Number of servers
K—Number of minimal servers needed for reconstruction Given this situation, the client or proxy will need random A1-Ak-1 integers. For this example, there may be 2 integers: a1=166 and a2=94, There will be a function $f(x)=S+a1*x+a2*(x2)$. Accordingly, from 1-N secret share points are: $(1,f(1))\ldots(N,f(N))$. Each server or database may receive a single point $(i,f(i))$ so that $1<=I<=N$. In this example, every 3 points can reconstruct S, which is the social security number.

Figure 6:
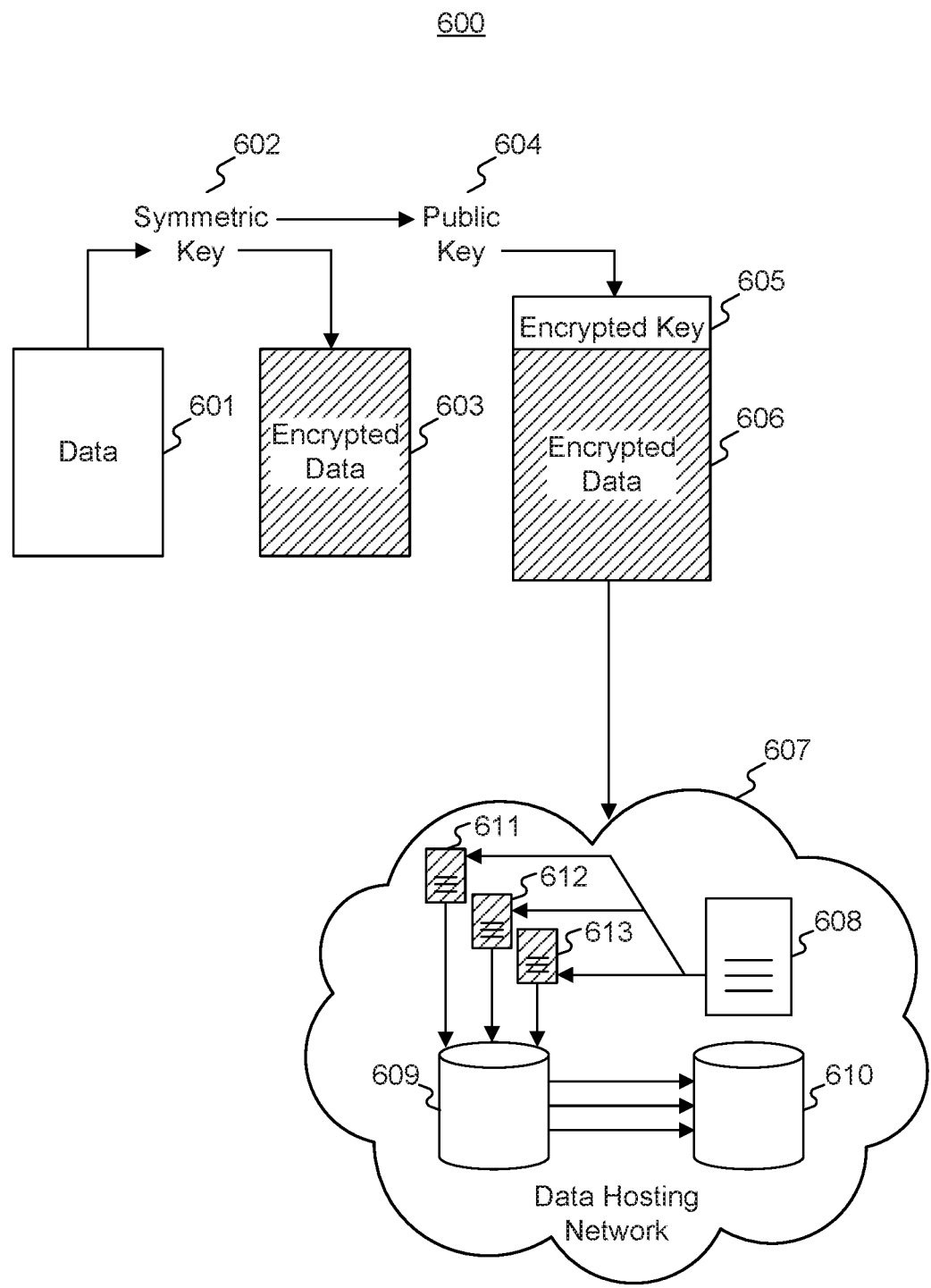
FIG. 6 is an exemplary illustration of a process of data encryption and hosting, where the data hosting resource splits the data into portions, in accordance with disclosed embodiments.

FIG. 6 is an exemplary illustration of a process 600 of data encryption and hosting, where the data hosting resource 607 splits the data into portions. Like process 400 and process 500, process 600 may be performed in the environments of systems 100 or 200 discussed in connection with FIGS. 1 and 2, utilizing a client 301 and/or proxy 302 as discussed in connection with FIG. 3.

The elements of FIG. 6 are generally similar to those of FIG. 4 and FIG. 5. For example, data 601, encrypted data 603, and encrypted data 606 plus metadata 605 may all be similar to their counterpart elements 401/501, 403/503, 406/506, and 405/505 of FIG. 4 and FIG. 5. In addition, operation 602 of encrypting the data 601 may be similar to operation 402 and operation 502, and operation 604 of encrypting the symmetric key using a public key of the user may be similar to operation 404 and 504. Further, data hosting network 607, including server 608, database 609, and backup storage 610 may be similar to elements 407/507, 408/508, 409/509, and 410/510 of FIG. 4 and FIG. 5.

Unlike process 500, however, process 600 involves the data hosting network 607 itself performing the data separation (e.g., sharding). In particular, according to process 600 the encrypted data 606 and metadata 605 may be transmitted to data hosting network 607 without splitting. Once received at data hosting network 607 (e.g., at server 608), the encrypted data 606 and metadata 605 may be split or sharded into portions 611, 612, and 613. As discussed above, various techniques may be used to determine the number of portions or shards to create (e.g., Shamir's secret-sharing scheme, Blakley's scheme, or various other types of schemes). Following such splitting or sharding, the resulting portions 611, 612, and 613 may be stored in one or more locations within database 609, within multiple databases 609, and/or backed up in database 610.

Figure 7:
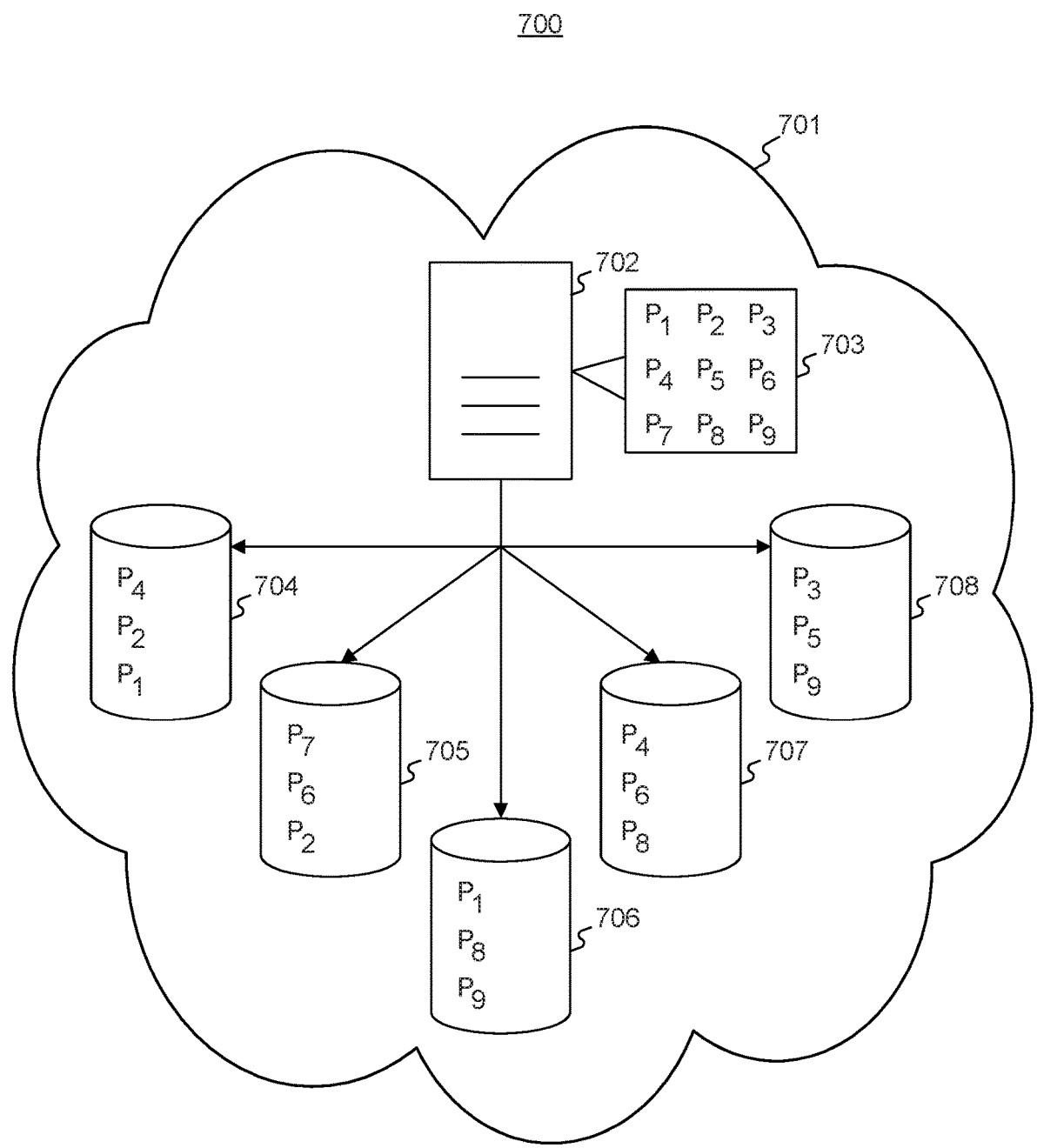
FIG. 7 is an exemplary illustration of a storage configuration allowing multiple portions of data to be securely stored in multiple locations in accordance with disclosed embodiments.

FIG. 7 is an exemplary illustration of a storage configuration 700 allowing multiple portions of data to be securely stored in multiple locations. Consistent with the above discussion, a file (either separated or not) may be received at server 702. If the file is not already separated, server 702 may perform a partitioning or sharding technique, as discussed above. In this example, the file either arrives as, or is partitioned by server 702 into, nine different portions, $P_1$, $P_2$, $P_3$, $P_4$, $P_5$, $P_6$, $P_7$, $P_8$, and $P_9$. In FIG. 7, the nine portions are stored in cache or memory 703, which is used by server 702 as it processes the incoming file. Server 702 then determines which of databases or storage locations 704, 705, 706, 707, and 708 should receive each of portions, $P_1$, $P_2$, $P_3$, $P_4$, $P_5$, $P_6$, $P_7$, $P_8$, and $P_9$. As illustrated, each of databases or storage locations 704, 705, 706, 707, and 708 stores three different portions of the file. Of course, different numbers of portions may be stored, depending on the splitting or sharding algorithm being used. Further, based on the requirements of the algorithm, a certain number of databases or storage locations 704, 705, 706, 707, and 708 may need to be accessed to obtain all of the portions corresponding to the file. As can be seen, there is more than one possibility of obtaining the necessary portions in storage arrangement 700. One possibility could be databases 704, 705, 707, and 708. Another possibility could be databases 704, 705, 706, and 708.

Figure 8:
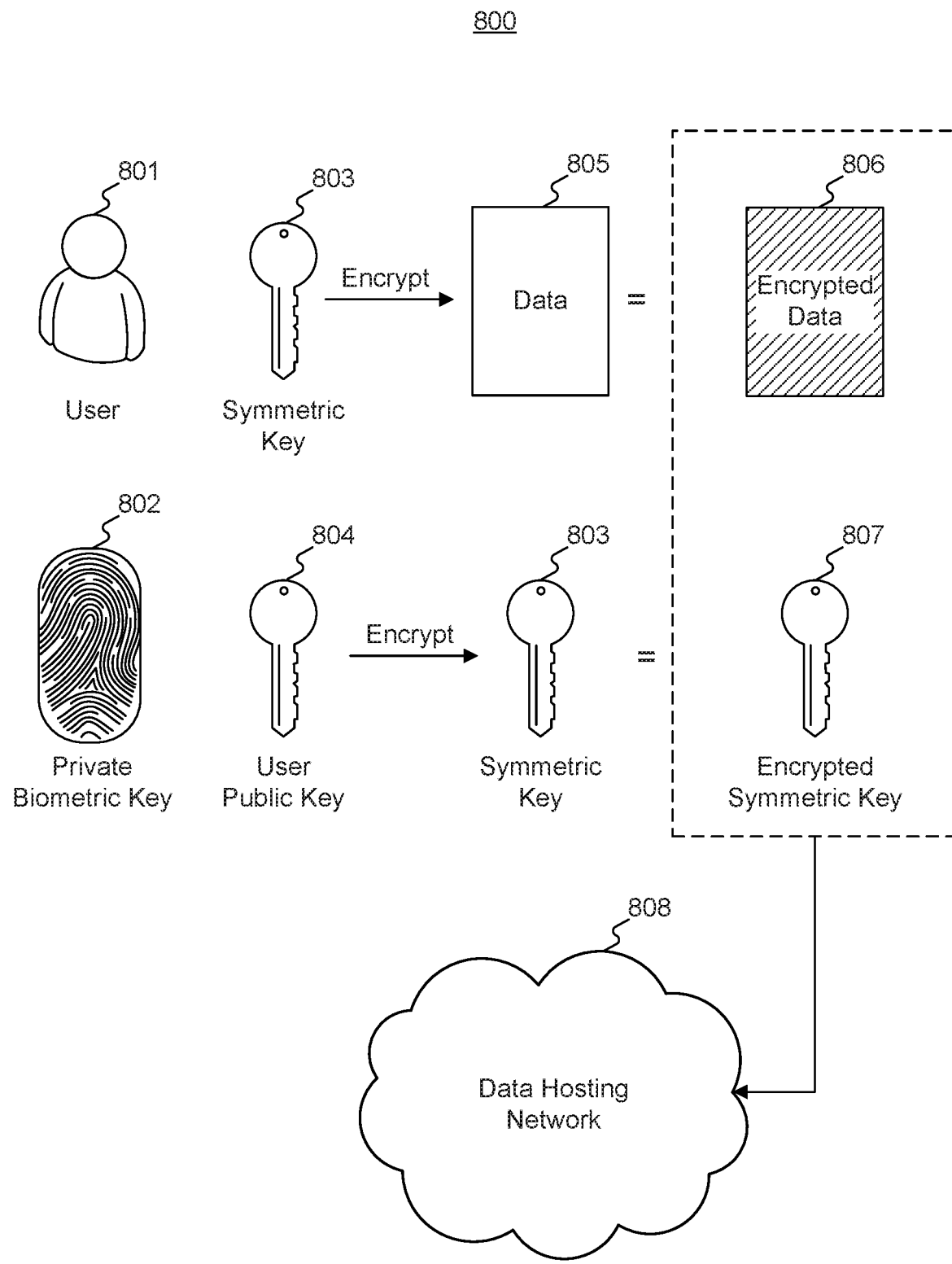
FIG. 8 is an exemplary illustration of a process of a user invoking biometric data to encrypt and securely share data in accordance with disclosed embodiments.

FIG. 8 is an exemplary illustration of a process 800 of a user 801 invoking biometric data to encrypt and securely share data. Consistent with the above disclosure, process 800 may be practiced in the environments of FIG. 1 or 2. For example, the user 801 may be attempting to upload the data 805 (e.g., textual content, an image, a video file, a word processing document, etc.) to data hosting network 101 or its virtual data hosting network 105, or blockchain network 201. In general, process 800 may involve similar steps to processes 400, 500, and 600, as discussed above.

Consistent with processes 400, 500, and 600, process 800 may involve a user 801 determining that they want to upload a file 805 to data hosting network 808 or to share the file 805 with another user. As part of process 800, the user 801 (e.g., through a client or proxy, as discussed above) may utilize a symmetric key 803 to encrypt the file 805 they are seeking to upload or share. The result of the encryption is encrypted file 806. Consistent with processes 400, 500, and 600, encrypted data 806 may further include metadata (e.g., in a header or trailer, or in a separate file). The metadata may include an encrypted version 807 of the symmetric key 803. As discussed above, the symmetric key 803 may be encrypted based on a public key 804 of the user 801. The public key 804 may be part of a private/public key pair, where the private key 802 is based on a unique physical or other biometric trait of the user 801 (e.g., retina, fingerprint, follicle sample, voice recognition, gesture recognition, facial recognition, typing or touchscreen patterns, walking patterns, driving patterns, etc.). Once the encrypted data 806 and metadata including encrypted symmetric key 807 are created, they may be transmitted to data hosting network 808. As discussed above, encrypted data 806 and metadata including encrypted symmetric key 807 may be separated at the client or proxy, separated at the server that receives them (e.g., in data hosting network 808), or not separated at all.

Figure 9:
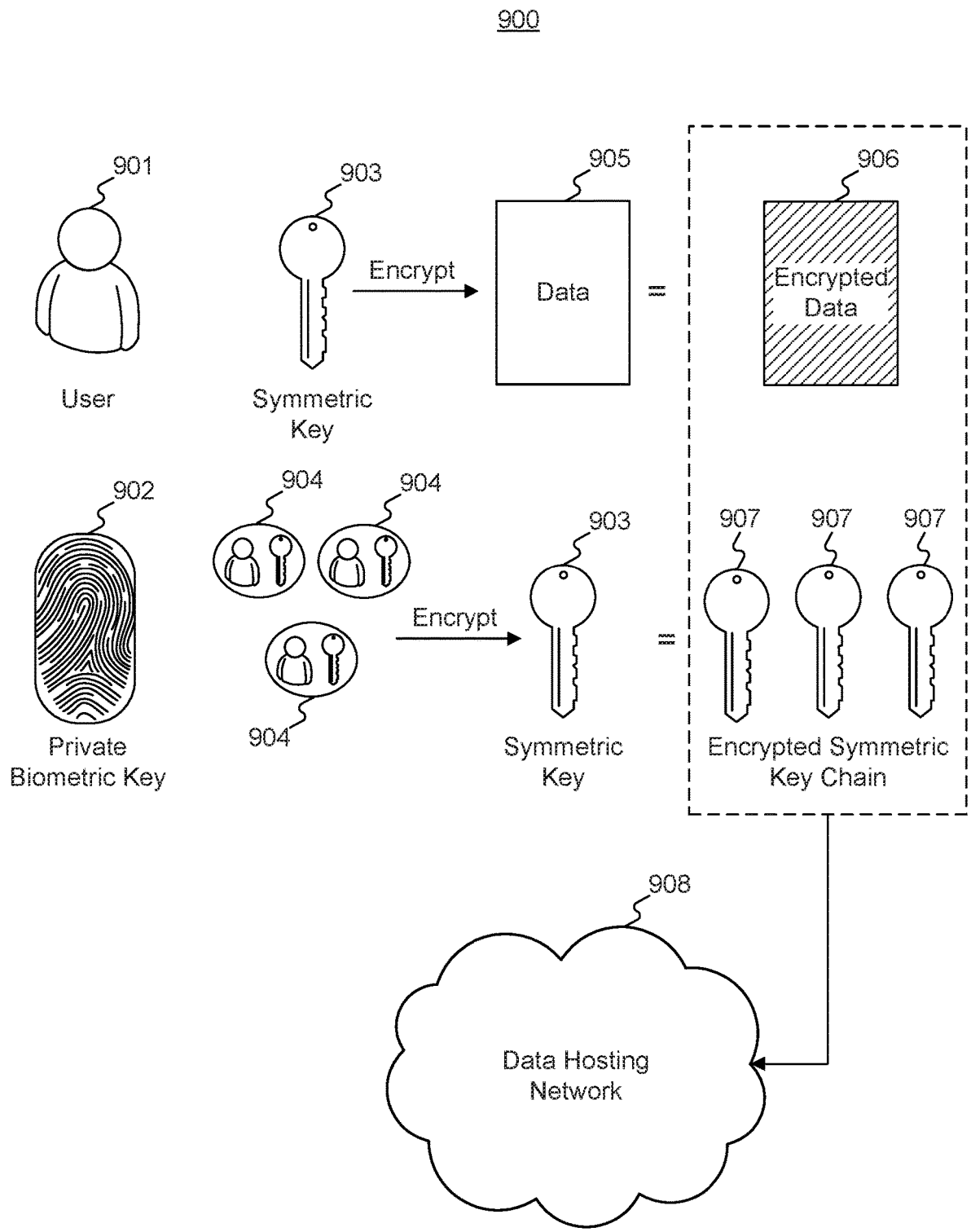
FIG. 9 is an exemplary illustration of a process of a user invoking biometric data to encrypt and securely share data with multiple keys in accordance with disclosed embodiments.

FIG. 9 is an exemplary illustration of a process 900 of a user 901 invoking biometric data to encrypt and securely share data with multiple keys. Process 900 may be practiced, for example, where user 901 seeks to share data 905 with other users. Consistent with the above disclosure, process 900 may be practiced in the environments of FIG. 1 or 2. For example, the user 901 may be attempting to upload the data 905 (e.g., textual content, an image, a video file, a word processing document, etc.) to data hosting network 101 or its virtual data hosting network 105, or blockchain network 201. In general, process 900 may involve similar steps to processes 400, 500, and 600, as discussed above.

As discussed above in connection with processes 400, 500, and 600, process 900 may involve a user 901 determining that they want to upload a file 905 to data hosting network 908 for access by other users or to share the file 905 with other users. As part of process 900, the user 901 (e.g., through a client or proxy, as discussed above) may utilize a symmetric key 903 to encrypt the file 905 they are seeking to upload or share. The result of the encryption is encrypted file 906. Consistent with processes 400, 500, and 600, encrypted data 906 may further include metadata (e.g., in a header or trailer, or in a separate file). The metadata may include encrypted versions 907 of the symmetric key 903. If the user wants to share data 905 with one or more other users, the user 901 may encrypt the symmetric key 903 with both their own unique identification information (e.g., its own public key 904) and also with the public key 904 of the other user to receive the file 905. As shown in FIG. 9, there are three public keys 904, one corresponding to user 901 and two other public keys 904 corresponding to other users that may receive the data 905. Through encrypting the symmetric key 903 based on each public key 904, the file's metadata 907 may contain a set of encrypted keys such that only the users whose public keys 904 were involved in the encryption of the symmetric key 903 can decrypt the symmetric key 903, and thus decrypt the entire file. Consistent with the disclosure above, each of the users (e.g., user 901 and the two users with whom data 905 is being shared) may utilize their respective private key to decrypt the symmetric key. Such private keys 902 may be based on unique physical or other biometric attributes of each user. The encrypted data 906 and metadata (e.g., containing encrypted symmetric key chain 907) may then be sent to data hosting network 908. The encrypted data 906 and metadata may be split or sharded by the client or proxy of user 901, by the data hosting network 908, or not split or sharded at all.

Figure 10:
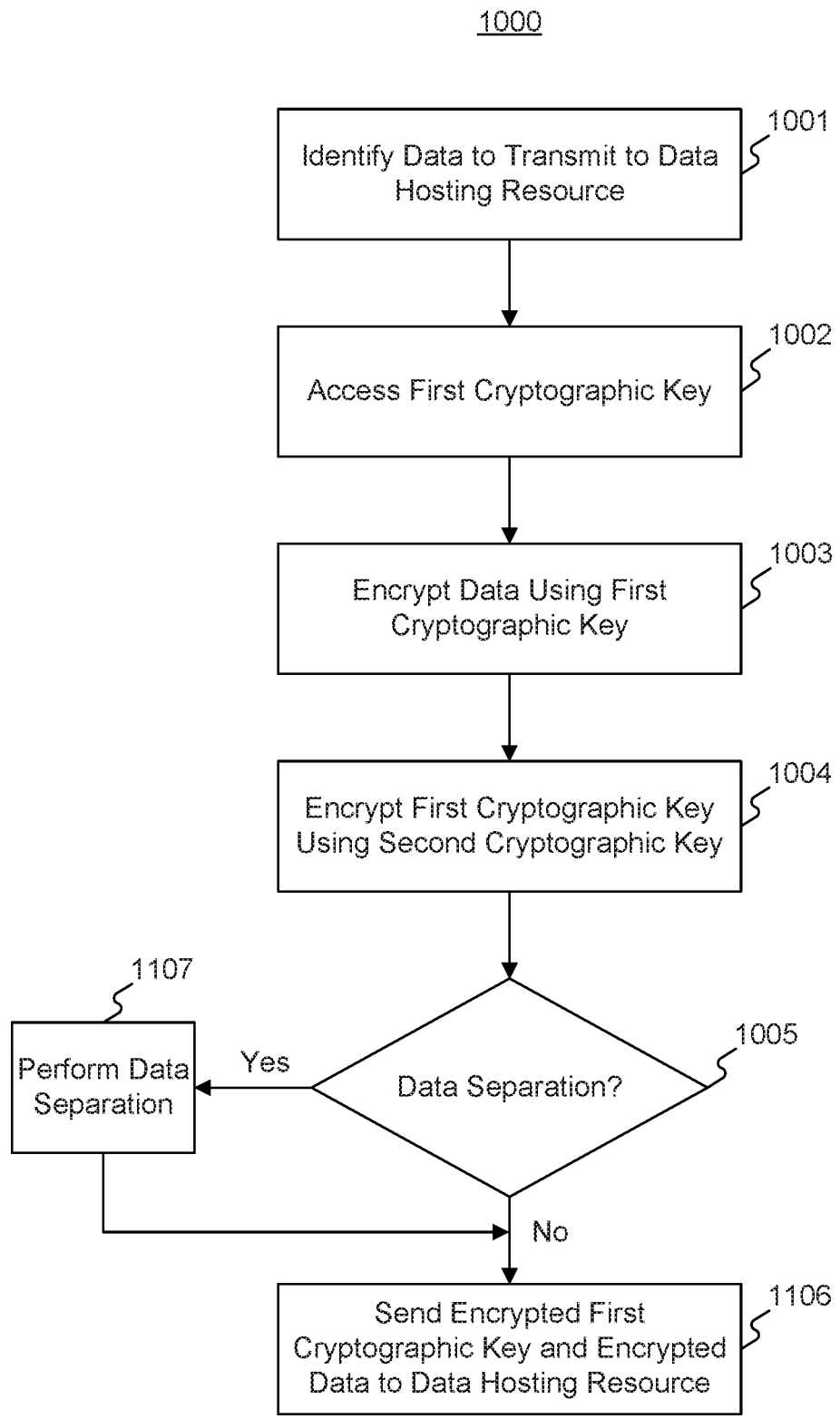
FIG. 10 is a flowchart depicting a process of secure distribution of client identity data in accordance with disclosed embodiments.

FIG. 10 is a flowchart depicting a process 1000 of secure distribution of client identity data. Process 1000 may be practiced in the system environments of FIG. 1 or 2, utilizing a client and/or proxy as described in connection with FIG. 3. For example, process 1000 may be practiced by a client, a proxy, or a combination of both. In many respects, process 1000 may be based on the operations described in connection with processes 400, 500, 600, 800, and 900.

In an operation 1001, process 1000 may include identifying data associated with a client identity to be transmitted over a network to a data hosting resource. For example, as discussed above, the client may be a hardware-based device or application running on a hardware-based device, and a user of such a device may choose to upload or share certain data with a remote resource or with another user. As an example, the client may be a mobile device or an application running on a mobile device. The client identity may be a particular user, account name, account identifier, application identifier, application session, user session, or other identifier of a person, application, or machine. The data to be transmitted may take various forms, such as textual data, an image file, a video file, a web page file, executable code, etc.

As part of operation 1001, the client identity may identify data to be transmitted to a data hosting resource, such as data hosting resource 101, virtual data hosting resource 105, or blockchain network 201, as discussed above. Alternatively, the client or proxy may perform the identifying of the data to be transmitted. As discussed above, in some embodiments the client or proxy may determine whether the data to be transmitted is sensitive, and should thus be encrypted as discussed in the remainder of process 1000. Alternatively, the user may designate or categorize the data as sensitive. In other embodiments, the client or proxy is configured (e.g., by default, or by selection) to treat all data as sensitive and subject to the encryption stages discussed below.

In an operation 1002, process 1000 may include accessing a first cryptographic key. For example, as discussed above in connection with FIG. 3, client 301 or proxy 302 may have a key generator 303/304 configured to generate asymmetric and/or symmetric cryptographic keys. In some embodiments, key generator 303/304 may generate a symmetric cryptographic key in operation 1002. In other embodiments, such a cryptographic key has already been generated or received by client 301 or proxy 302, and may be stored (e.g., in memory 310) for accessing.

In an operation 1003, process 1000 may include encrypting the data using the first cryptographic key. For example, as discussed in connection with FIG. 4, data 401 (e.g., textual data, an image file, a video file, a web page file, executable code, etc.) may be encrypted using the symmetric key to produce encrypted data 403. Of course, in other embodiments other types of encryption may be performed to yield encrypted data 403.

According to operation 1004, process 1000 may include encrypting the first cryptographic key (e.g., the symmetric key used to encrypt the data) using a second cryptographic key. As discussed above, the symmetric key may be encrypted, for example, using a public key associated with the user, which is part of a unique private/public key pair of the user. In such an embodiment, the public key may be used to encrypt the symmetric key, such that the encrypted symmetric key can be decrypted based on a person having rights to the data providing a unique physical attribute. The unique physical attribute may be, or may be used to create, the unique private key that is part of the private/public key pair of the user. Consistent with the discussion above in connection with FIG. 3, the private key may be, or may be based on, unique personal or biometric information captured or capturable by sensor 313 or biometric interface 314 of client 301. Notably, in embodiments where the encrypted data is shared externally (e.g., with the data hosting resource, with another user, etc.), the data remains secured and private, since only the user has access to its private key needed to decrypt the data.

In an operation 1005, process 1000 may determine whether separation of the data (e.g., either before or after it has been encrypted) is needed. In some embodiments, as discussed above in connection with FIG. 4, there may not be separation of the data. For example, the encrypted file may be stored at data hosting network 407 in essentially the same form as it was transmitted by the client or proxy, without separation or partitioning. In other embodiments, as discussed above in connection with FIG. 5, the data may be separated into portions (e.g., Portion$_1$, Portion$_2$, and Portion$_n$), either before or after encryption. The portions may then be transmitted to data hosting network 507 for storage. In further embodiments, as discussed above in connection with FIG. 6, the separating or partitioning may be performed by data hosting network 607 itself. For example, the encrypted data 606 (with or without embedded metadata 605) may be received at server 608, and separated or partitioned into portions 611, 612, and 613 for storage. As discussed above, various techniques may be utilized to perform the separation and storage of data. Any one or more of these techniques may be utilized in operation 1007, if the result of operation 1005 is that the data should be separated. Otherwise, process may continue with operation 1006.

In operation 1006, process 1000 includes sending the encrypted first cryptographic key and the encrypted data to the data hosting resource over the network. For example, as discussed above in connection with FIGS. 4-6, a client or proxy may send the encrypted first cryptographic key (e.g., in metadata) and the encrypted data itself to a data hosting network 407/507/607. Notably, because only the user has access to the private key in their private/public key pair (e.g., based on their unique personal or biometric traits), only the user can decrypt the data. Accordingly, the data hosting resource cannot decrypt the encrypted first cryptographic key or the encrypted data, because it lacks such a private key. The data hosting resource may be configured to store the encrypted first cryptographic key and the encrypted data in one or more data storage locations, depending on whether and what form of separation or partitioning is being used, Subsequently, as discussed below in connection with FIG. 12, the user may later receive and decrypt the encrypted data using their private key.

Figure 11:
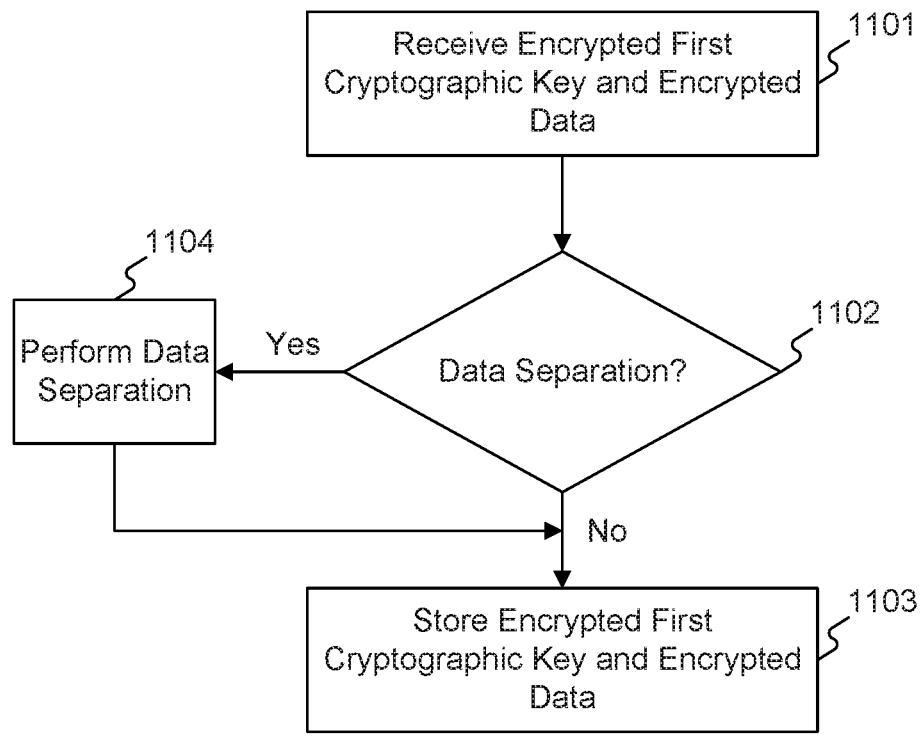
FIG. 11 is a flowchart depicting a process of secure receipt and storage of client identity data in accordance with disclosed embodiments.

FIG. 11 is a flowchart depicting a process 1100 of secure receipt and storage of client identity data. Process 1100 may be practiced in the system environments of FIG. 1 or 2, involving a client and/or proxy as described in connection with FIG. 3. For example, process 1100 may be practiced by a data hosting resource, including one or more of its constituent servers and/or databases. In many respects, process 1000 may be based on the operations described in connection with processes 400, 500, 600, 800, and 900.

In an operation 1101, process 1100 may include receiving an encrypted first cryptographic key and encrypted data from a client or proxy. In this regard, operation 1101 may be the operation performed by the data hosting resource that corresponds to operation 1006 in process 1000, While operation 1006 of sending the encrypted first cryptographic key and encrypted data is performed from the perspective of the client or proxy, operation 1101 or receiving the encrypted first cryptographic key and encrypted data is the corresponding operation performed by the data hosting resource. Alternatively, in some embodiments, operation 1101 may be performed by another client or proxy that is receiving the encrypted first cryptographic key and encrypted data (e.g., as part of a data sharing process).

Figure 12:
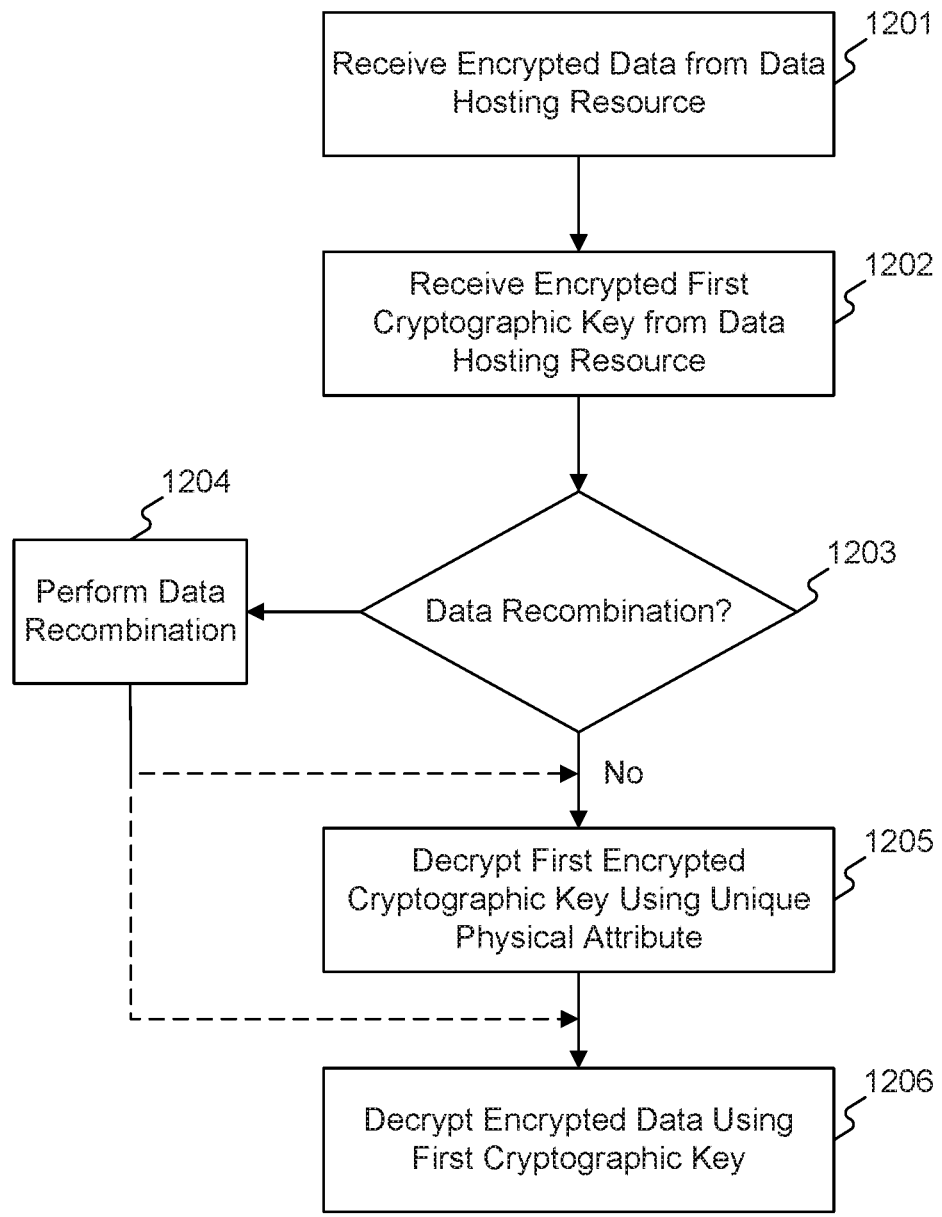
FIG. 12 is a flowchart depicting a process of secure retrieval and decryption of client identity data in accordance with disclosed embodiments.

In an operation 1102, process 1100 may determine whether the received data needs to be separated. As discussed above in connection with operation 1006 of process 1000, the encrypted data may or may not already been separated or sharded when it is received in operation 1101. If the data is determined to be separated or partitioned in operation 1102, such separation or sharding may be performed in operation 1104 before storage in operation 1103. Otherwise, the encrypted first cryptographic key and encrypted data may directly be stored in operation 1103. As discussed in connection with FIG. 7, for example, one or several different storage locations or databases 704/705/706/707/708 may be utilized to store the received encrypted first cryptographic key and encrypted data. The encrypted first cryptographic key and encrypted data may then later be accessed for retrieval or sharing from such storage locations. Notably, even though the encrypted first cryptographic key and encrypted data are stored by the data hosting resource on its equipment, the data hosting resource is unable to actually access (e.g., decrypt) the data because it lacks the unique private key held by the user who encrypted the data and the first cryptographic key FIG. 12 is a flowchart depicting a process 1200 of secure retrieval and decryption of client identity data. With reference to FIGS. 8 and 9, for example, process 1200 may occur when a user 801/901 receives data from another user of another client or proxy. Further, process 1200 may occur when the user 801/901 who created certain data, or who owns the data, wishes to retrieve and access the data from data hosting network 808/908.

In an operation 1201, process 1200 may include receiving encrypted data from the data hosting resource. For example, in some embodiments the user's client or proxy will issue a request (e.g., an HTTP request, HTTPS request, request transmitted through a secure tunnel, etc.) to the data hosting resource for the data. As an illustration, the user may request access to a stored word processing document, image file, video file, or stored personal information maintained in encrypted form at the data hosting resource. In response to such a request, the data hosting resource (e.g., via its server) may send the encrypted data to the client or proxy. Of course, in some embodiments, users may request groups of data or files from the data hosting resource, rather than individual data or files. For example, a user y request to receive the contents of an entire folder stored at the data hosting resource, or a collection of related files (e.g., all files created on the same date, having a common name attribute, having a common classification or categorization, etc.).

In some embodiments, operation 1201 includes operation 1202 of receiving the encrypted first cryptographic key from the data hosting resource. As discussed above, the encrypted first cryptographic key may be stored with the encrypted data (e.g., as metadata or a tag), and thus may be received by the user together with the encrypted file as part of operation 1201. In alternative embodiments, however, the encrypted first cryptographic key may be received by the user separately from the encrypted file itself. In such a situation, operations 1201 and 1202 may be separate.

In some embodiments, the client or proxy may determine whether the encrypted first cryptographic key and/or encrypted file have been manipulated. For example, the client or proxy may examine the encrypted first cryptographic key and determine whether it was encrypted using the user's public key and/or is capable of being decrypted using the user's private key. If not, the client or proxy may signal an alert, confirming the potential alteration of the encrypted first cryptographic key. This may signal that the encrypted first cryptographic key was modified after it was originally uploaded by the client or proxy, Further, the client or proxy may verify whether the encrypted file was properly encrypted using the symmetric key and/or can be decrypted using the symmetric key. If not, an alert regarding potential modification to the file may be triggered. In some embodiments, these verification and alerting techniques may be performed at the network storage resource rather than at the client or proxy. In that event, the network storage resource may trigger an alert (e.g., an alert available to an administrator of the network storage resource, or an alert sent to the user).

In an operation 1203, process 1300 may include determining whether to recombine the received data. If the data is to be recombined, the recombination may be performed in operation 1204, either before or after it is decrypted. For example, as discussed above, the encrypted data may be split or sharded according to various different algorithms (e.g., Shamir's secret-sharing scheme, Blakley's scheme, or various other types of schemes), Once the encrypted data is received at the client or proxy, it may be recombined in operation 1204 corresponding to the same algorithm by which it was separated or sharded. Alternatively, the recombination in operation 1204 may occur at the data hosting resource before the encrypted data is sent to the client or proxy in operation 1201. Either way, the recombination may be based on the same splitting or sharding technique used to partition the data for storage. Following the recombination in operation 1204, process 1200 may continue at operation 1205 or 1206, as discussed above. Further, in some embodiments, operation 1204 is not performed (e.g., because the data was never split or sharded, and thus recombination is not needed).

In operation 1205, the client or proxy may decrypt the first encrypted cryptographic key. As discussed above, the first encrypted cryptographic key may be an encrypted symmetric key that is included in metadata of the encrypted file, or in a separate file. The client may, for example, decrypt the first encrypted cryptographic key using its private key that is based on a unique personal or biometric trait of the user. This may involve accessing a stored personal or biometric trait of the user (e.g., from memory 310 in FIG. 3) or utilizing the sensor 313 or biometric interface 314 of FIG. 3 to capture the physical or biometric trait of the user (e.g., a fingerprint scan, retinal scan, follicle sample, voice sample, etc.). Accordingly, if the first encrypted cryptographic key (e.g., a symmetric key) was encrypted by the user's public key originally, it may be decrypted using the user's corresponding private key.

Once the first encrypted cryptographic key (e.g., symmetric key) has been decrypted in operation 1205, operation 1206 may involve decrypting the actual file itself. For example, if the first encrypted cryptographic key is decrypted as a symmetric key, the symmetric key may then be used to decrypt the file. The user may then access the file just as it could before the file was encrypted.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for secure distribution and use of client identity data, the operations comprising:
   identifying data associated with a client identity to be transmitted over a network to a data hosting resource;
   accessing a symmetric cryptographic key for encrypting the data associated with the client identity;
   encrypting the data using the symmetric cryptographic key;
   identifying a first identity and a second identity with whom to share at least a portion of the data associated with the client identity;
   generating an encryption key chain by:
      encrypting the symmetric cryptographic key using a first cryptographic key and a second cryptographic key, the first cryptographic key being associated with the first identity and the second cryptographic key being associated with the second identity, wherein the encrypted symmetric cryptographic key can be decrypted based on at least one of the first identity or the second identity providing a unique attribute, wherein the first cryptographic key is based on a unique attribute of the first identity and the second cryptographic key is based on a unique attribute of the second identity; and
   sending the encryption key chain and the encrypted data to the data hosting resource over the network, wherein only the identities involved in the encryption process can decrypt the encrypted symmetric key or the encrypted data;
   wherein the data hosting resource is configured to store the encryption key chain and the encrypted data in one or more data storage locations.

2. The non-transitory computer readable medium of claim 1, wherein a person is associated with the client identity.

3. The non-transitory computer readable medium of claim 1, wherein the non-transitory computer readable medium is part of a device on which the client identity operates.

4. The non-transitory computer readable medium of claim 1, wherein the non-transitory computer readable medium is part of a proxy agent in communication with the client identity.

5. The non-transitory computer readable medium of claim 1, wherein at least one of the first cryptographic key or the second cryptographic key is a public key.

6. The non-transitory computer readable medium of claim 1, wherein the operations further comprise separating the encrypted data into a plurality of data portions and sending the plurality of data portions to the data hosting resource.

7. The non-transitory computer readable medium of claim 1, wherein the data hosting resource is configured to separate the encrypted data into a plurality of data portions and store the plurality of data portions in separate data storage locations.

8. The non-transitory computer readable medium of claim 7, wherein the data hosting resource is configured to reconstruct the encrypted data from at least a subset of the plurality of data portions in the separate data storage locations.

9. The non-transitory computer readable medium of claim 7, wherein the data hosting resource is configured to compute a number of the separate data storage locations in which to store the plurality of data portions.

10. The non-transitory computer readable medium of claim 1,
    wherein the operations further comprise:
    receiving the encrypted data from the data hosting resource;
    receiving the encryption key chain from the data hosting resource; and
    decrypting the encryption key chain using the unique attribute.

11. The non-transitory computer readable medium of claim 10, wherein the operations further comprise decrypting the encrypted data using the encryption key chain.

12. A computer-implemented method for secure distribution and use of client identity data, the method comprising:
    identifying data associated with a client identity to be transmitted over a network to a data hosting resource;
    accessing a symmetric cryptographic key for encrypting the data associated with the client identity;
    encrypting the data using the symmetric cryptographic key;
    identifying a first identity and a second identity with whom to share at least a portion of the data associated with the client identity;
    generating an encryption key chain by:
       encrypting the symmetric cryptographic key using a first cryptographic key and a second cryptographic key, the first cryptographic key being associated with the first identity and the second cryptographic key being associated with the second identity, wherein the encrypted symmetric cryptographic key can be decrypted based on at least one of the first identity or the second identity providing a unique physical attribute, wherein the first cryptographic key is based on a unique attribute of the first identity and the second cryptographic key is based on a unique attribute of the second identity; and
    sending the encryption key chain and the encrypted data to the data hosting resource over the network, wherein only the identities involved in the encryption process can decrypt the encrypted symmetric key or the encrypted data;
    wherein the data hosting resource is configured to store the encryption key chain and the encrypted data in one or more data storage locations.

13. The computer-implemented method of claim 12, wherein accessing the symmetric cryptographic key includes generating the symmetric cryptographic key.

14. The computer-implemented method of claim 12, further comprising:
    identifying a separate identity with which the data associated with the client identity should be shared; and
    encrypting the symmetric cryptographic key using a key from the encryption key chain including one or more keys associated with the encryption of the symmetric cryptographic key, wherein the encryption key chain includes a key associated with the separate identity.

15. The computer-implemented method of claim 12, further comprising storing the encryption key chain in association with the encrypted data.

16. The computer-implemented method of claim 12, further comprising storing the encryption key chain in metadata of the encrypted data.

17. The computer-implemented method of claim 12, wherein the data hosting resource is configured to separate the encrypted data into a plurality of data portions and store the plurality of data portions in separate data storage locations.

18. A non-transitory computer readable medium including instructions that, when executed by at least one processor, cause the at least one processor to perform operations for secure distribution and use of client identity data, the operations comprising:
- receiving, at a data hosting resource, an encrypted cryptographic encryption key chain and encrypted data;
- wherein the received encrypted data has been encrypted using a symmetric cryptographic key;
- wherein the received encryption key chain has been generated by:
- encrypting the first symmetric cryptographic key using a first cryptographic key and a second cryptographic key;
- wherein the symmetric cryptographic key can be decrypted based on a person having rights to the data providing a unique attribute; and
- storing the encryption key chain and the encrypted data in one or more data storage locations associated with the data hosting resource, wherein the data hosting resource cannot decrypt the symmetric cryptographic key or the encrypted data.

19. The non-transitory computer readable medium of claim 18, wherein the operations further comprise separating the encrypted data into a plurality of data portions and storing the plurality of data portions in separate data storage locations associated with the data hosting resource.

20. The non-transitory computer readable medium of claim 19, wherein the operations further comprise reconstructing the encrypted data from at least a subset of the plurality of data portions in the separate data storage locations associated with the data hosting resource.

* * * * *